United States Patent

[11] 3,598,215

| [72] | Inventors | James R. Summer<br>Brielle;<br>Henry C. MacLaughlin, New Shewsbury,<br>both of, N.J. |
|---|---|---|
| [21] | Appl. No. | 755,987 |
| [22] | Filed | Aug. 28, 1968 |
| [45] | Patented | Aug. 10, 1971 |
| [73] | Assignee | The Garrett Corporation<br>Los Angeles, Calif. |

[54] INFLATABLE ESCAPE SLIDE
10 Claims, 8 Drawing Figs.

[52] U.S. Cl. .................................................. 193/25, 244/137
[51] Int. Cl. ....................................................... B65g 11/10
[50] Field of Search .......................................... 193/25, 250, 25 IE, 25 B, 25 X; 182/48; 244/137

[56] References Cited
UNITED STATES PATENTS

| 3,070,203 | 12/1962 | Hailstone | 193/25 (B) |
| 3,473,641 | 10/1969 | Fischer | 193/25 (B) |
| 3,458,009 | 7/1969 | Favors | 193/25 |

*Primary Examiner*—Andres H. Nielsen
*Attorneys*—Orville R. Seidner and John N. Hazelwood ABSTRACT: An inflatable escape slide stowed in an exterior aircraft compartment has an inflatable column structure attached to one end of the inflatable slide structure. The column structure is secured to the aircraft at a point distal of the egress door of the craft and securely positions the upper end of the slide immediately adjacent the door sill upon inflation. The column structure thus secures and supports the slide end for passenger egress.

PATENTED AUG 10 1971

INVENTORS
JAMES R. SUMMER
HENRY C. MacLAUGHLIN
BY
Orville R. Beidney
AGENT

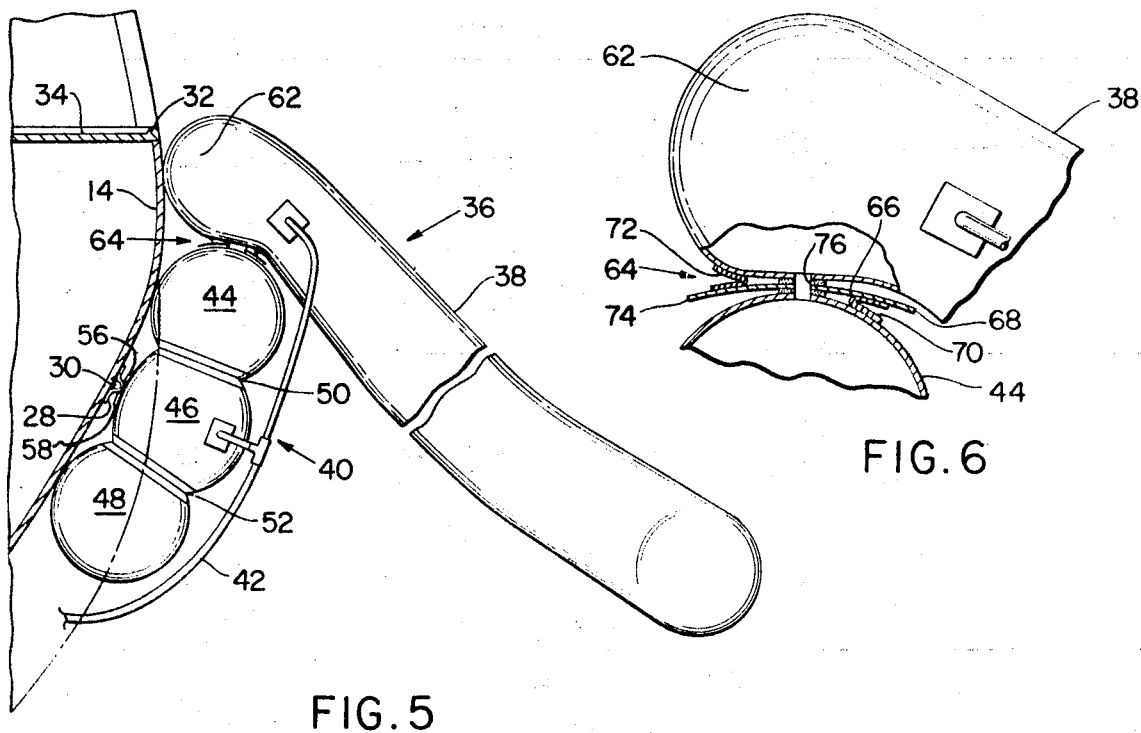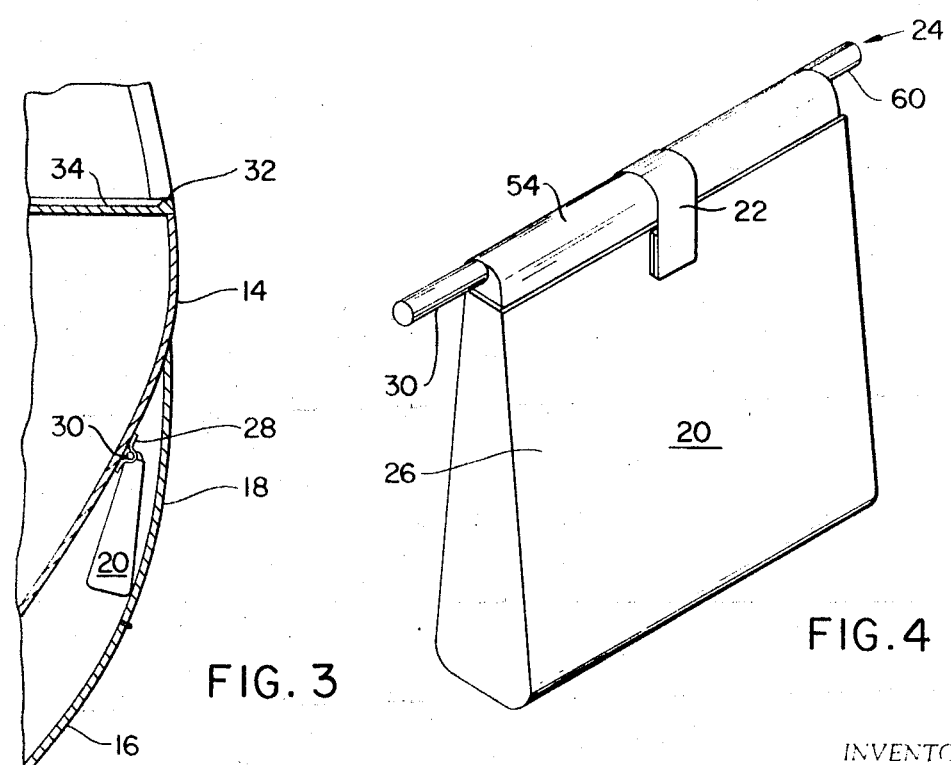

INVENTORS.
JAMES R. SUMMER
HENRY C. MacLAUGHLIN

AGENT

INFLATABLE ESCAPE SLIDE

BACKGROUND OF THE INVENTION

This invention relates in general to the art of flexible wall chutes, and relates in particular to inflatable escape slides provided on aircraft and the like for facilitating the safe and rapid egress of persons or cargo from an aircraft under adverse conditions such as a forced landing at locations where no rigid stair, ramp or gangplank is available, the egress opening or exit door in such cases usually being elevated quite some distance above the ground. It has been customary to provide inflatable escape slides for aircraft, such as those for example, patterned after the escape slide shown and described in U.S. Pat. No. 2,765,131, issued Oct. 2, 1956, in the name of James F. Boyle.

In that patent the escape slide is shown in one embodiment as rolled up and stowed uninflated against the interior wall of the aircraft adjacent the exit door, one end of the chute being secured to a hinged bar which is swingable to a position in front of the door whereafter the slide chute may be inflated to extend outside the door from the floor to the ground beneath the craft. It is obvious, of course, that such a slide storage arrangement causes at least some congestion in the door area which is not at all desirable, particularly in an area of considerable traffic. Furthermore, the visible presence of this type of emergency equipment is not conducive to complete confidence and relaxation on the part of the more timid passengers on the craft.

In another embodiment disclosed in the patent the rolled up and uninflated slide is stowed in a storage compartment immediately below the floor in front of the door. In this embodiment one end of the chute is secured to a fixed bar which of necessity is spaced inwardly from the skin of the craft and below the door sill. Thus the upper end of the sloping slide surface adjacent the exit door is necessarily spaced somewhat below the door sill. It has been determined that this displacement factor introduces a psychological deterrent since it calls for a downward step or a small jump downward from the door sill to the slide surface by a person exiting from the craft. This results in a hesitation by timid persons who are perturbed at having to step or jump downwardly from the fairly firm door sill to the sloping slide surface, and hesitation to evacuate an aircraft in an emergency situation may well prove dangerous to lives, if not fatal.

SUMMARY OF THE INVENTION

The present invention overcomes the disadvantages of prior art inflatable slide structures by way of a novel structural combination of members secured together and which may be secured to the exterior of a fixed structure. The structural combination comprises a slide member having one end secured to a columnar positioning member, both of which are inflatable with the positioning member comprising the means to secure the structural combination to the fixed structure at a point distal of an egress opening therein.

Means are provided to inflate both members, substantially simultaneously, from a source of pressurizing fluid to a pressure which may be of the order of about 1.5 to 2.5 pounds per square inch. As the inflation of the positioning member proceeds, that portion of the slide member secured to the positioning member is deployed by the inflating positioning member from the stowed location to a position in which the slide surface is immediately adjacent the sill of the egress opening.

The columnar positioning member also serves to support the said one end of the slide member and prevent any substantial downward displacement moments thereof when the mass of an exiting person or cargo is disposed on the slide surface. To this end, the columnar positioning member may be comprised of a plurality of side-by-side column portions which constitute a fluid-trussed beam of sufficient strength against bending to support the slide end as aforesaid. This column structure is designed so that upon inflation surface portions thereof bear against the fixed structure on both sides of a girt bar which secures the column structure to the fixed structure.

BRIEF DESCRIPTION OF THE DRAWINGS

FIG. 3 is an elevation view, schematic in form, showing a fragmentary portion of the aircraft of FIGS. 1 and 2 in cross section to illustrate the stowage of the inflatable escape slide in a compartment remotely and distally disposed from an egress of the aircraft;

FIG. 4 is a perspective view, somewhat schematic in form, of the soft container package for the escape slide encased therein, in uninflated and folded condition;

FIG. 5 is a view similar to FIG. 3 and showing the escape slide inflated and deployed;

FIG. 6 is an enlarged fragmentary view of a portion of the escape slide showing one embodiment of the attachment means for securing one end of the slide proper to the inflatable positioning structure;

DESCRIPTION OF THE PREFERRED EMBODIMENTS

Figure 1:
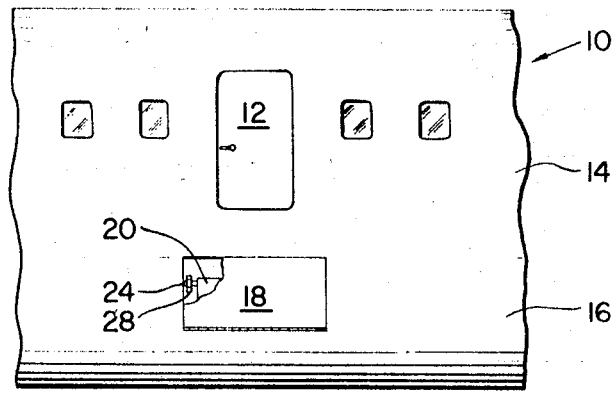
FIG. 1 is a side elevation view, schematic in form, of a portion of an aircraft fuselage.

Referring to FIG. 1 of the drawings, an aircraft fuselage 10 is shown as having a door 12, for egress by passengers, disposed in the skin or covering 14 of the fuselage 10. The fuselage also comprises a compartment-forming skin 16 which merges with the skin 14. Let into the skin 16 is a hinged door 18 behind which is concealed the soft container 20 (see also FIGS. 3 and 4) within which is folded and stowed the uninflated slide forming the structural subject matter of the invention.

The container 20 comprises a closure flap 22 which may be of the familiar Velcro hook and pile variety which extends over the girt bar 24 to engage the front flap 26 of the container 20 for retention of the folded slide structure therein. The structural details of the container form no part of the invention, hence will not be described in any further detail beyond pointing out that the girt bar 24 extends beyond each side edge of the container 20 to the end that the entire container and folded contents may be secured within the compartment space between the hinged door 18 and the skin 14 of the aircraft fuselage, as by loop brackets, one of which designated by the reference numeral 28 is shown disposed over the end 30 of the girt bar 24.

Referring to FIG. 3, it will be seen that the girt bar is disposed below and at quite some distance from the sill 32 in the opening formed in the skin 14 for the door 12. As is customary, the sill 32 is substantially a projection of the surface of the floor 34 in the aircraft, being elevated only slightly above the floor surface as dictated by aircraft design requirements.

Figure 2:
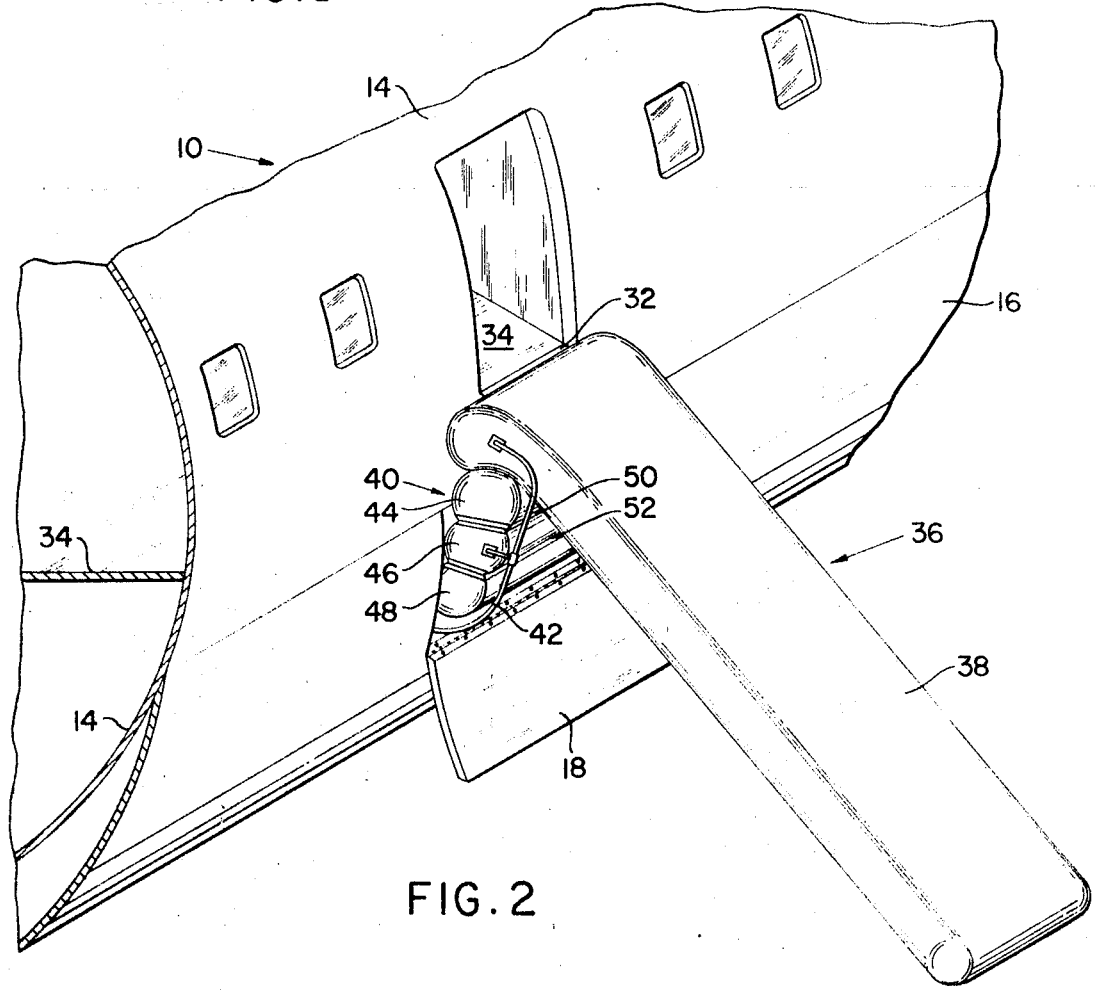
FIG. 2 is a perspective view, also schematic in form, of an enlarged portion of the aircraft depicted in FIG. 1 and showing the escape slide of the invention deployed adjacent an egress of the aircraft.

As stated hereinabove, the drawing FIGS. 1, 2 and 3 are schematic in form, particularly as to the aircraft configuration as regards the showing of the compartment-forming skin 16 and the hinged door 18 let into the skin. It is apparent, of course, that the door 18, which is shown as hinged on its lower edge to the skin 16, may partake of general nature of the arrangement shown in FIG. 8 of the aforementioned Boyle U.S. Pat. No. 2,765,131. It is also apparent that the compartment for containment of the container 20 and its contents may be comprised of an external "blister" secured to the skin 14 of the aircraft by explosive retainer rivets, for example, as a means by which the blister could be normally retained and then "popped" off the aircraft to expose the container 20 attached to the skin 14 thereof.

The particular mode or manner of forming or providing the stowage compartment on the aircraft for the uninflated slide forms no part of the present invention which is concerned solely with the means to secure the slide structure to the aircraft at a point remote from the egress, and means to deploy the slide surface to the egress, will now be described.

Referring to FIGS. 2 and 5, the slide structure 36 is seen as comprised of a slide member 38 and a positioning member 40, both of which are inflatable, and providing fluid-trussed structural members when inflated through a hose 42 coupled to a source of fluid under pressure, as for example a compressed air source in the aircraft such as that shown in the aforementioned Boyle U.S. Pat. No. 2,765,131. The slide member 38 may be of any preferred configuration, such as the escape slide shown in the Schacht et al. U.S. Pat. No. 3,102,623 issued Sept. 3, 1963.

The positioning member 40 is comprised of an upper horizontal girder element 44, an intermediate horizontal girder element 46 and a lower horizontal girder element 48. The three girder elements 44, 46 and 48 are of generally tubular configuration and preferably formed as a unitary structure defining the inflatable member 40 with crotch tapes 50 and 52, respectively, secured as with cementing between the girders 44 and 46 and the girders 46 and 48. As will be seen, the positioning member thus has a configuration resembling an air mattress.

The girt bar 24 is secured to the intermediate girder element 46 substantially midway between the tapes 50 and 52. To this end an elongate girt loop 54 passing over the girt bar 24 has its elongate edges 56 and 58 secured by any preferred means to the girder element 46. Thus when the girt bar is secured to the skin 14, as by a loop bracket 28 over the end 30 and another loop bracket (not shown) over the other end 60 of the girt bar 24, the entire positioning member 40 is effectively secured to the aircraft at a point distally disposed from the sill 32 of the egress opening.

As depicted in FIG. 6, the lower face of the upper end 62 of the slide 38 is secured by a hinge arrangement 64 to the top surface of the upper horizontal girder element 44. The arrangement 64 comprises an elongate hinge element 66 extending from end to end of the girder element 44 and having one edge 68 secured thereto by a folded crotch tape 70 which has respective fold edges secured to the hinge element edge 68 and the girder element 44 as by sewing or cementing, or in any preferred manner. The folded crotch tape 72 serves the same purpose as between the edge 74 of the element 66 and the contiguous lower surface of the end 62 of slide 38. The fold edges of the folded tape 72 are, of course, secured by sewing or cementing to the respective parts of the element 66 and the slide end 62, in like manner to the fold edges of tape 70.

At spaced intervals along the hinge arrangement 64 is a plurality of passageways, preferably four in number, providing communication between the upper end 62 of the inflatable slide number 38 and the upper girder element 44 of the inflatable positioning number 40. These passageways, one of which is illustrated at 76 in FIG. 6, serve to equalize the pressure as between the inflated member 38 and 40. Referring to FIG. 6, it is seen that the passageway 76 is defined by radial cemented areas around the passageway, one radial cemented area being disposed between the hinge element 66 and the end 62 of the slide member 38, and another cemented area between the hinge element 66, and the girder element 44 of the positioning number 40.

It will be appreciated that the hinge arrangement 64 provides a pivotal coupling between the positioning and slide members which permits the slide member to pivot at this point so that the sliding surface of the slide member 38 will have a slope that will provide optimum rate of descent for evacuees from the aircraft regardless of the altitude of the aircraft and landing gear extension positions. Obviously, other hinge or coupling type arrangements may be designed without departing from the spirit of the invention disclosed herein.

FUNCTIONAL MODE OF THE INVENTION

The foregoing description is given in connection with one embodiment of the invention as depicted in FIGS. 1—6. As explained, the slide structure 36 of FIG. 1 is normally disposed in the soft container 20, in uninflated and folded condition, the complete assembly being secured by the girt bar 24 behind the hinged door 18 in the concealed compartment between the two skins 14 and 16 of the aircraft 10.

Inflation and deployment of the slide 36 may be initiated by authorized personnel within the plane by release of the door 18, which, in turn, swings downwardly about the hinge. Simultaneously, or immediately after release of the door 18, fluid pressure is communicated to the slide members 38 and 40 through the hose 42 and inflation procedure is initiated. The start of inflation causes the closure flap 22 on the container 20 to disengage the front flap 26 of the container, whereupon the members 38 and 40 are freed from the container for continued inflation.

Positioning member 40, when inflated, is positioned substantially as shown by reason of the attachment point defined by the girt bar 25 and the straps which secure the bar 24 to the aircraft. The fluid pressure serves to position the girder elements 44, 46 and 48 snugly adjacent the skin 14 of the aircraft substantially as shown, with the upper end 62 of the slide member deployed upwardly upwardly as shown. Thus the slide surface on the slide member 38 is available for evacuation of passengers or cargo from the aircraft when the door 12 is opened.

The positioning member 40, having the characteristic of a fluid-stressed structure, utilizes the characteristic of the girder elements 46 and 48, for example, to resist moments about the attachment point of the girt bar 24, which moments are imparted to the member 40 by the presence of masses (people or cargo) disposed on the surface of the slide member 38; hence the upper end 62 of the latter remains firmly positioned against the aircraft skin. Most importantly, the fluid stressed structure of the girder elements 44 and 46 perform the important function of deploying the slide member into position and restraining it against subsequent downward or outward movement thereafter.

As illustrated in the drawing FIGS. 2 and 5, the positioning member 40 is comprised of horizontally disposed girder elements 44, 46 and 48. An alternate embodiment shown in FIGS. 7 and 8 shows a positioning member 80 which is comprised of vertically disposed fluid stressed structure elements 82, 84, 86, 88 and 90 forming an integral unit, likewise fabricated after the fashion of air mattress construction, details of which are well known to those skilled in the art and having no need for detailed explanation herein.

Figure 7:
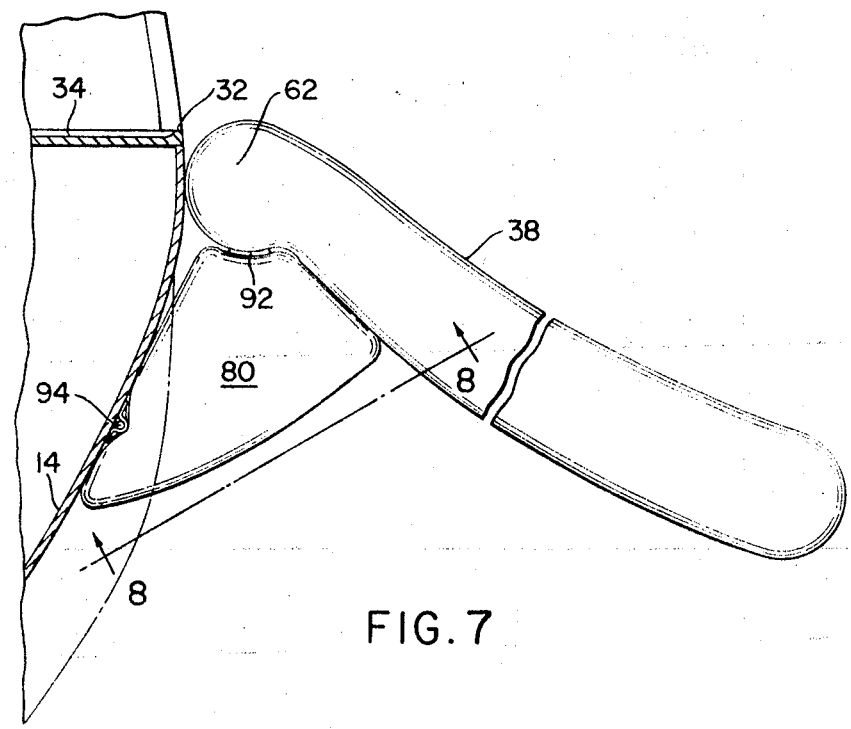
FIG. 7 is a view similar to FIG. 5 and showing an alternate embodiment.
Figure 8:
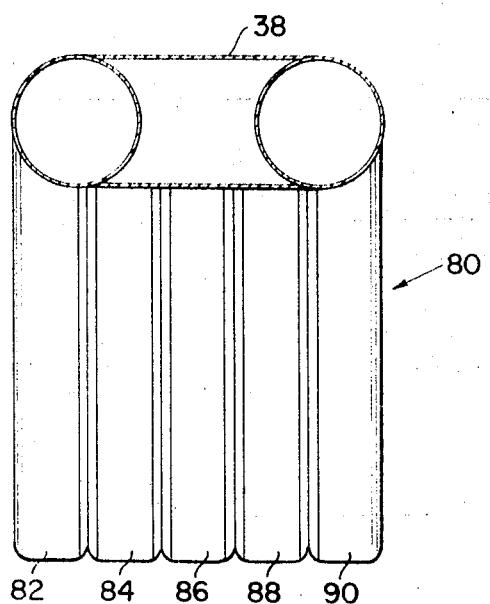
FIG. 8 is a view taken on the line 8-8 of FIG. 7.

As depicted in FIG. 7, the member 80 may be of generally wedge-shaped configuration provided with an elongate hingelike coupling 92, securing the upper end 62 of the slide member 38 to the positioning member 80, which, in turn, is secured at the attachment point 94 to the skin 14 of the aircraft by means of a girt and girt bar arrangement similar to that described hereinabove in connection with FIG. 3. It is apparent to those skilled in the art that the particular configuration of the positioning member is a matter of choice which may be dictated by design consideration for particular circumstance. That is to say, the positioning member is obviously not limited to the configurations described hereinabove, nor is the invention to be limited to the particular means described for securing the positioning member to the aircraft at the location shown.

What we claim is:

1. An inflatable structure arranged for attachment to a generally fixed structure, comprising:
   a. a first inflatable structure member of generally elongate configuration from one end to another thereof when said first member is inflated;

b. a second inflatable structure member having a bearing surface extending between spaced apart locations on said second member;

c. attaching means adjacent one of said ends of said first member and adjacent one of said locations thereby joining said first and second members together;

d. means for securing said second inflatable structure member to said fixed structure, said securing means being at said bearing surface and spaced from the point of attachment of said members portions of said bearing surface on opposite sides of said securing means are in position to engage said fixed structure when said second member is inflated; and e. means for inflating said structure members whereby said bearing surface engages said fixed structure when said inflatable structure is attached thereto by said securing means, and positions said one end of said first member firmly above said second member.

2. The structure of claim 1 in which said inflating means includes a fluid pressure source at said fixed structure.

3. The structure of claim 1 in which said attaching means extends transversely of said first member and said securing means extends substantially parallel to said attaching means whereby said attaching means and said securing means allow relative pivoting movement between said first and second members.

4. An inflatable structure arranged for attachment to a generally fixed structure, comprising:
    a. a first inflatable structure member of generally elongate construction from one end to another thereof when said first member is inflated;
    b. a second inflatable structure member attached adjacent one of said ends of said first member;
    c. means for securing said second inflatable structure member to said fixed structure,
        said securing means being distally disposed from the point of attachment of said members whereby said one end of said first member is distally disposed in spaced relation from said securing means when said second member is inflated; and
    d. means for inflating said structure members with said one end of said first member thereupon disposed adjacent said fixed structure and supported thereat by inflation fluid pressure in said second member; said fixed structure being an aircraft and said inflatable structure being an egress slide structure which in normal or uninflated condition is stored in an exteriorly disposed compartment of said aircraft distally disposed from an egress opening in said aircraft, said storage compartment being below said egress opening, and said second inflatable structure member deploying said one end of said first inflatable structure member from said compartment to the lower sill area of said egress opening upon inflation of said second member.

5. An inflatable structure arranged for attachment to a generally fixed structure, comprising:
    a. a first inflatable structure member of generally elongate configuration from one end to another thereof when said first member is inflated;
    b. a second inflatable structure member attached adjacent one of said ends of said first member;
    c. means for securing said second inflatable structure member to said fixed structure,
        said securing means being distally disposed from the point of attachment of said members whereby said one end of said first member is distally disposed in spaced relation from said securing means when said second member is inflated; and
    d. means for inflating said structure members with said one end of said first member thereupon disposed adjacent said fixed structure and supported thereat by inflation fluid pressure in said second member; and second inflatable structure member being comprised of a plurality of generally columnar portions in side-by-side relationship when inflated, with said securing means forming a part of one of said portions, the attachment point of said second inflatable member to said first inflatable member forming a part of another of said portions.

6. The structure of claim 5 in which said securing means is formed along the columnar axis of said one of said portions and said attachment point is formed along the columnar axis of said another of said portions.

7. The structure of claim 5 in which said securing means spans each of said portions between the ends thereof and said attachment point spans each of said portions at one end thereof.

8. In combination in an aircraft provided with an egress and a sill thereat and having an equipment storage compartment distally disposed from the egress and openable to the exterior of the aircraft, an inflatable structure stowed uninflated within said compartment, said inflatable structure comprising:
    a. an elongate inflatable slide member;
    b. an inflatable positioning member having means securing said positioning member to a wall of said aircraft compartment,
        one end of said slide member being hingedly coupled with a connecting portion of said positioning member, said connecting portion being distal of said securing means; and
    c. means for inflating said members to a pressurized condition wherein said one end of said slide member is deployed out of said compartment by said positioning member to a position such that the slide surface of said slide member is substantially located at said egress sill.

9. The combination of claim 8 in which said aircraft compartment is located below said sill, and inflation of said positioning member deploys said one end of said slide member upwardly out of said compartment.

10. The combination of claim 9 in which said inflation means comprises a fluid source in said aircraft.

UNITED STATES PATENT OFFICE
CERTIFICATE OF CORRECTION

Patent No. 3,598,215          Dated August 10, 1971

Inventor(s) James R. Summer and Henry C. MacLaughlin

It is certified that error appears in the above-identified patent and that said Letters Patent are hereby corrected as shown below:

Column 5, line 10, after "members" insert --whereby--

Column 6, line 17, delete "and" substitute --said--

Signed and sealed this 28th day of March 1972.

(SEAL)
Attest:

EDWARD M. FLETCHER, JR.          ROBERT GOTTSCHALK
Attesting Officer                 Commissioner of Patents